(12) United States Patent
Nagy et al.

(10) Patent No.: US 6,998,451 B2
(45) Date of Patent: Feb. 14, 2006

(54) OLEFIN POLYMERIZATION PROCESS

(75) Inventors: Sandor Nagy, Naperville, IL (US); Karen Neal-Hawkins, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 112 days.

(21) Appl. No.: 10/611,827

(22) Filed: Jul. 1, 2003

(65) Prior Publication Data

US 2005/0004330 A1 Jan. 6, 2005

(51) Int. Cl.
*C08F 4/52* (2006.01)
*C08F 4/06* (2006.01)

(52) U.S. Cl. ............. 526/161; 526/172; 526/135; 526/941

(58) Field of Classification Search ............. 526/161, 526/153, 135, 172, 170; 502/414; 802/208
See application file for complete search history.

(56) References Cited

U.S. PATENT DOCUMENTS

| | | | | |
|---|---|---|---|---|
| 4,596,862 | A | 6/1986 | McDaniel et al. | 526/106 |
| 5,698,758 | A * | 12/1997 | Rieser et al. | 585/502 |
| 5,869,587 | A | 2/1999 | Auburn et al. | 526/233 |
| 6,184,169 | B1 * | 2/2001 | Sartain | 502/111 |
| 6,211,311 | B1 | 4/2001 | Wang et al. | 526/131 |
| 6,232,260 | B1 | 5/2001 | Nagy et al. | 502/155 |
| 6,440,889 | B1 | 8/2002 | Tsuie | 502/152 |
| 6,451,724 | B1 | 9/2002 | Nifant'ev et al. | 502/103 |
| 6,541,583 | B2 | 4/2003 | Meverden et al. | 526/127 |
| 6,559,251 | B1 | 5/2003 | Wang et al. | 526/127 |
| 2003/0004052 | A1 * | 1/2003 | Lynch et al. | 502/117 |
| 2004/0181017 | A1 * | 9/2004 | Lynch et al. | 526/127 |

FOREIGN PATENT DOCUMENTS

| WO | WO 99/24446 | 5/1999 |
|---|---|---|
| WO | WO 01/53360 | 7/2001 |

OTHER PUBLICATIONS

Noh et al., *J. Organometal. Chem.* 580 (1990) 90.
Buu-Hoi and Xuong, *J. Chem. Soc.* (1952) 2225.
Jüngling et al., *J. Organometal, Chem.* 460 (1993) 191.
Noh et al., *J. Organometal. Chem.* 518 (1996) 1.

* cited by examiner

*Primary Examiner*—David W. Wu
*Assistant Examiner*—Rip A. Lee
(74) *Attorney, Agent, or Firm*—John Tyrell; Jonathan L. Schuchardt

(57) ABSTRACT

A process for making polyolefins is disclosed. The process comprises polymerizing an olefin in the presence of an activator, an organometallic complex, and an aluminum phosphate support. The complex comprises a Group 3 to 10 transition metal and an indenoindolyl ligand that is bonded to the transition metal. The use of the aluminum phosphate support in combination with the indenoindolyl complex provides an unexpected boost in catalyst activity when compared with other common supports. When a combination of olefins is used, good comonomer incorporation is obtained.

8 Claims, No Drawings

OLEFIN POLYMERIZATION PROCESS

FIELD OF THE INVENTION

This invention relates to a process for polymerizing an olefin with an aluminum phosphate supported organometallic complex and an activator. The process gives improved catalyst activity.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. To improve polymer properties, single-site catalysts, in particular metallocenes are beginning to replace Ziegler-Natta catalysts.

Catalyst precursors that incorporate a transition metal and an indenoindolyl ligand are known. U.S. Pat. Nos. 6,232,260 and 6,451,724 disclose the use of transition metal catalysts based upon indenoindolyl ligands, but have no examples using supported catalysts. While they mention that supported catalysts may be used, little information is given. They list silica and alumina as possible support materials and do not mention aluminum phosphate.

WO 01/53360 discloses open architecture indenoindolyl catalysts that may be supported on an inert support. There is no mention of aluminum phosphate as a support material. In the single example (Example 8) preparing a supported catalyst, a solution of the catalyst is added to a polyethylene support.

U.S. Pat. No. 6,559,251 discloses a process for polymerizing olefins with a silica-supported, indenoindolyl Group 4–6 transition metal complex having open architecture. U.S. Pat. No. 6,211,311 teaches that many heterometallocenes are inherently unstable and this causes difficulties in supporting these catalysts and poor catalyst activity. This problem is avoided by using chemically treated supports to prepare supported catalysts containing heteroatomic ligands. Aluminum phosphate is not mentioned. The examples use silica or alumina.

U.S. Pat. No. 6,541,583 discloses a process for polymerizing propylene in the presence of a Group 3–5 transition metal catalyst that has two non-bridged indenoindolyl ligands. None of the examples uses a supported catalyst. They state that the catalyst can be immobilized on a support and state that the support is preferably a porous material such as inorganic oxides or chlorides and polymer resins. There is no mention of aluminum phosphate.

Pending application Ser. No. 10/123,774, filed Apr. 16, 2002, discloses a process for polymerizing ethylene in the presence of a silica supported Group 3–10 transition metal catalyst that has two bridged indenoindolyl ligands. Aluminum phosphate is not mentioned and silica is the only support used.

Aluminum phosphate supports are known. U.S. Pat. No. 4,596,862 polymerizes ethylene with a catalyst comprising a chromium compound on a fluorided aluminophosphate support with a phosphorus to aluminum molar ratio of 0.15 to 0.4. In the examples, the supported catalyst is prepared by adding an aqueous solution of chromium nitrate to a hydrogel made from aluminum nitrate and ammonium dihydrogen phosphate.

U.S. Pat. No. 5,869,587 teaches an olefin polymerization process with an active catalytic component on a specific aluminophosphate support. The active catalytic component is described as any component which has activity for the polymerization of alpha-olefins and which does not interact adversely with the aluminophosphate support. However, there is no teaching as to which types of catalysts fulfill these requirements other than a statement that Ziegler type catalysts are suitable. Preferably the active catalytic component is chromium and the examples all have an aqueous solution of $CrO_3$ impregnated on the aluminophosphate.

Despite the considerable work that has been done with catalysts based upon indenoindolyl ligands, there is a need for improvement, especially with regard to catalyst activity and comonomer incorporation. Improved catalyst activity lowers the catalyst cost per pound of polyolefin and also gives polyolefins with reduced levels of transition metal. High levels of transition metal can have a deleterious effect on properties such as thermal stability and photostability. Improved comonomer incorporation reduces polyolefin density and improves certain properties such as toughness.

SUMMARY OF THE INVENTION

The invention is a process for making polyolefins. The process comprises polymerizing an olefin in the presence of an activator, an organometallic complex, and an aluminum phosphate support. The complex comprises a Group 3 to 10 transition metal and an indenoindolyl ligand that is bonded to the transition metal. The use of the aluminum phosphate support in combination with these indenoindolyl complexes provides an unexpected boost in catalyst activity when compared with other common supports such as silica or alumina. When a combination of olefins is used, good comonomer incorporation is obtained.

DETAILED DESCRIPTION OF THE INVENTION

The invention is an olefin polymerization process. The process enables good catalyst activity.

Suitable olefins for the polymerization are $C_2$–$C_{20}$ α-olefins, such as ethylene, propylene, 1-butene, 1-hexene and 1-octene, cyclic olefins such as cyclohexene and nonconjugated dienes such as ethylidene norbornene and mixtures thereof. Preferred olefins are ethylene, propylene and mixtures thereof with α-olefins such as 1-butene, 1-hexene and 1-octene. More preferably ethylene is copolymerized with a $C_3$–$C_{20}$ α-olefin. Most preferably, ethylene is copolymerized with 1-butene, 1-hexene or 1-octene.

Optionally, hydrogen is used in the polymerization to regulate the molecular weight. The amount of hydrogen needed depends upon the desired polyolefin molecular weight and flow. Generally, as the amount of hydrogen is increased, the polyolefin molecular weight decreases and the flow increases. For many applications, the polyolefin flow will be too low if the polymerization is done in the absence of hydrogen.

Suitable activators include alumoxanes, alkyl aluminums, alkyl aluminum halides, anionic compounds of boron or aluminum, trialkylboron and triarylboron compounds. Examples include methyl alumoxane (MAO), polymeric MAO (PMAO), ethyl alumoxane, diisobutyl alumoxane, triethylaluminum, diethyl aluminum chloride, trimethylaluminum, triisobutylaluminum, lithium tetrakis(pentafluorophenyl)borate, lithium tetrakis(pentafluorophenyl)aluminate, dimethylanilinium tetrakis-pentaflourophenyl)borate, trityl tetrakis(pentafluorophenyl)borate, tris(pentafluorophenyl)-borane, triphenylborane, tri-n-octylborane, the like, and mixtures thereof. Selection of activator depends on many factors including the organometallic complex used and the desired polymer properties.

The organometallic complex contains a Group 3 to 10 transition metal. Preferably the transition metal is a Group 3–5 transition metal, more preferably a Group 4 transition metal. Most preferably, the transition metal is zirconium.

The organometallic complex contains an indenoindolyl ligand bonded to the transition metal. "Indenoindolyl" ligands are conveniently generated by deprotonating an indenoindole compound using a potent base. By "indenoindole compound," we mean an organic compound that has both indole and indene rings. The five-membered rings from each are fused, i.e., they share two carbon atoms. The rings can be fused such that the indole nitrogen and the only $sp^3$-hybridized carbon on the indenyl ring are "trans" to each other. Such is the case in an indeno[1,2-b]indole ring system such as:

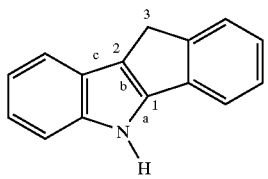

Suitable ring systems also include those in which the indole nitrogen and the $sp^3$-hybridized carbon of the indene are beta to each other, i.e., they are on the same side of the molecule. This is an indeno[2,1-b]indole ring system:

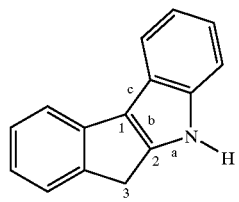

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beg inning with the ring at the uppermost right of the structure in a manner effective to give the lowest possible number to the heteroatom. Thus, 5,10-dihydroindeno[1,2-b]indole is numbered as follows:

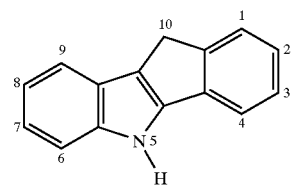

while 5,6-dihydroindeno[2,1-b]indole has the numbering:

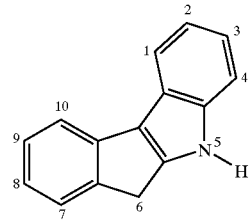

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in PCT Int. Appl. WO 99/24446 and U.S. Pat. No. 6,440,889.)

Methods for making indenoindole compounds are well known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appls. WO 99/24446 and WO 01/53360.

The indolyl nitrogen of each indenoindolyl group is typically substituted with an alkyl, aryl, dialkylboryl, trialkylsilyl, or a divalent linking group.

Preferably, the indenoindolyl ligand is bridged. By "bridged indenoindolyl ligand," we mean that the indenoindolyl group can be joined to a second ligand by a divalent linking group. A wide variety of linking groups are suitable for use and are described in the art. The linking group can be a conjugated pi-electron system, but it need not be conjugated. Suitable divalent linking groups include dialkylsilyl, diarylsilyl, alkylboranyl, arylboranyl, siloxy, polysiloxy, and hydrocarbyl groups. Preferred hydrocarbyl groups are alkylene, dialkylene, polyalkylene, arylene, diarylene, polyarylene, cycloalkyl, adamantyl, aralkylene, alkenyl, and alkynyl. Specific examples of suitable divalent linking groups are methylene, 1,2-ethenyl, 1,2-ethynyl, isopropylidene, 1,4-phenylene, α,α'-xylyl, 4,4'-biphenylene, 1,3-adamantyl, 1,4-adamantyl, phenylboranyl, methylboranyl, dimethylsilyl, diphenylsilyl, bis(dimethylsilyl), oxybis(dimethylsilyl), and the like. These and other divalent linking groups are described in the background references. (For some examples, see *J. Organometal. Chem.* 460 (1993) 191; 518 (1996) 1; 580 (1999) 90.) The divalent linking group can link the indenoindolyl ligand to a polymerization-stable ligand. Suitable polymerization-stable ligands include cyclopentadienyl, indenyl, fluorenyl, boraaryl, indenoindolyl, and the like.

Bridged indenoindolyl ligands also include those used in open architecture complexes. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indolyl nitrogen or the indenyl methylene carbon. Preferably, the metal is sigma-bonded to a heteroatom, i.e., oxygen, nitrogen, phosphorus, or sulfur; most preferably, the metal is sigma-bonded to nitrogen. The heteroatom is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to either the indolyl nitrogen atom or the indenyl methylene carbon.

Preferred bridged indenoindolyl ligands have a structure selected from the group consisting of:

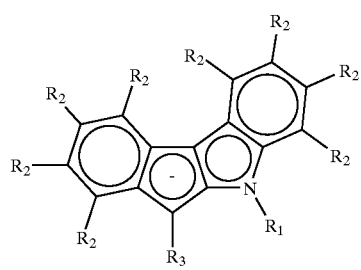

and

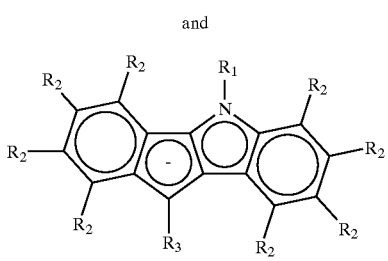

in which $R_1$ is selected from the group consisting of $C_1$–$C_{30}$ hydrocarbyl, dialkylboryl, trialkylsilyl, and divalent radicals connected to a second ligand; each $R_2$ is independently selected from the group consisting of $C_1$–$C_{30}$ hydrocarbyl, H, F, Cl and Br; $R_3$ is selected from the group consisting of $C_1$–$C_{30}$ hydrocarbyl, H, and divalent radicals connected to a second ligand with the proviso that one of $R_1$ or $R_3$ is a divalent radical connected to a second ligand wherein the divalent radical is selected from the group consisting of hydrocarbyl and heteroatom containing alkylene radicals, diorganosilyl radicals, diorganogermanium radicals and diorganotin radicals.

Additionally, the complex includes ancillary ligands that are bonded to the metal and satisfy the valence of the metal. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, benzyl).

In a preferred process of the invention, the bridged indenoindolyl complex has the general structure:

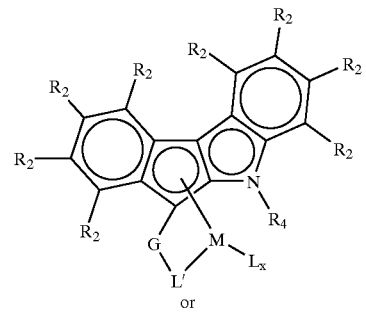

wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_4$ is selected from the group consisting of $C_1$–$C_{30}$ hydrocarbyl, dialkylboryl and trialkylsilyl; each $R_2$ is independently selected from the group consisting of $C_1$–$C_{30}$ hydrocarbyl, H, F, Cl and Br; G is a divalent radical is selected from the group consisting of hydrocarbyl and heteroatom-containing alkylene radicals, diorganosilyl radicals, diorganogermanium radicals and diorganotin radicals.

In another preferred process of the invention, the bridged indenoindolyl complex has the general structure:

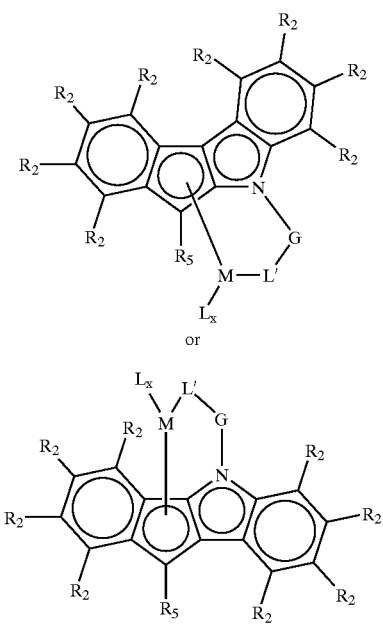

wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_5$ is selected from the group consisting of $C_1$–$C_{30}$ hydrocarbyl and H; each $R_2$ is independently selected from the group consisting of $C_1$–$C_{30}$ hydrocarbyl, H, F, Cl and Br; G is a divalent radical is selected from the group consisting of hydrocarbyl and heteroatom containing alkylene radicals, diorganosilyl radicals, diorganogermanium radicals and diorganotin radicals.

The complexes can be made by any suitable method; those skilled in the art will recognize a variety of acceptable synthetic strategies. Often, the synthesis begins with preparation of the desired indenoindole compound from particular indanone and arylhydrazine precursors. Treatment with base gives a ligand precursor. The indenoindole is linked with a second polymerization-stable ligand to give a linked ligand precursor. The final step normally involves reaction of the ligand precursor with a transition metal source to give the organometallic complex. The exact synthetic steps and the sequence used will normally depend upon the other ligands used and the transition metal source.

The process combines the organometallic complex with an aluminum phosphate support material. Preferably, the aluminum phosphate has a phosphorus to aluminum molar ratio of about 0.8:1 to about 1.1:1, more preferably a ratio of about 1:1. Preferably, the aluminum phosphate has a surface area of about 25 $m^2$/g to about 1000 $m^2$/g, more preferably from about 100 $m^2$/g to about 500 $m^2$/g. Preferably, the aluminum phosphate has a pore volume of about 0.2 mL/g to about 5 mL/g, more preferably from about 0.5 mL/g to about 2 mL/g.

Preferably the aluminum phosphate is dried before use. Preferably the drying is done at a temperature of from about 100° C. to about 800° C., more preferably from about 200° C. to about 600° C.

The amount of organometallic complex added per g aluminum phosphate is preferably from 0.01 mmol per gram to 0.5 mmol per gram.

The activator can be added directly to the polymerization reactor before or after adding an aluminum phosphate-supported organometallic complex. In other words, a supported complex—without the activator—can be prepared first. In one preferred process, a solution of the organometallic complex is combined with the aluminum phosphate. The mixture is stirred in an inert atmosphere at a temperature of from about 0° C. to about 120° C., more preferably from about 20° C. to about 40° C. The optimum stirring time will vary somewhat, depending upon the amounts of aromatic solvent and support material, but should be long enough to ensure good mixing. Preferably, the stirring time is from about 2 minutes to about 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free flowing solid. This can be done at room temperature by applying a vacuum. In one preferred embodiment, an incipient wetness technique is used. A small amount of solvent is used to dissolve the complex and the solution is added to the aluminum phosphate. The mixture remains a free flowing solid without solvent removal. The mixture can be used as is or residual solvent may be removed.

In another preferred embodiment, a solution of the activator is added to the aluminum phosphate prior to the addition of the organometallic complex. This solution can contain all of the activator to be used, but preferably, it contains a portion of the activator to be used. Any remaining activator is added to the reactor at the start of the polymerization.

Even more preferably, the organometallic complex is premixed with a solution of some or all of the activator prior to addition to the aluminum phosphate. This technique is illustrated by Examples 2–5 below. Preferably, the organometallic complex and activator solution are premixed for a period of time between 1 minute and two hours. When the organometallic complex is premixed with a solution of the activator, it is preferable to use a portion of the activator and to add the remainder of the activator to the reactor prior to the addition of the premix. In this embodiment, preferably an alkyl aluminum compound is added to the reactor prior to the addition of the catalyst supported on aluminum phosphate.

Preferably, a scavenging amount of an alkyl aluminum compound such as triethyl aluminum or triisobutyl aluminum is also added to the reactor. Preferably, the alkyl aluminum compound is added to the reactor prior to the addition of the supported complex.

A wide variety of olefin polymerization processes can be used. Preferred processes are slurry, bulk, solution, and gas-phase processes. A slurry or gas-phase process is preferably used.

The polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psia to about 50,000 psia. More preferred is the range from about 15 psia to about 1000 psia.

Catalyst concentrations used for the olefin polymerization depend on many factors. Preferably, however, the concentration ranges from about 0.01 micromoles transition metal per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Preparation of [1,1-Dimethyl-1-(cyclopentadienyl) silyl]-5,10-dihydrido-5,8-dimethyl-indeno[1,2-b] indolylzirconium dichloride 1-6

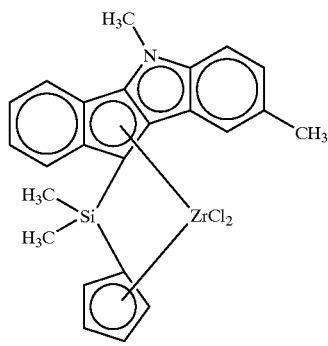

1-6

(a) Preparation of 8-methyl-5,10-dihydroindeno[1,2-b]indole 1-1 A 1 L 3 neck flask equipped with mechanical stirrer, reflux condenser, and glass stopper was charged with 1-indanone (46.1 g, 0.35 mol) and p-tolylhydrazine hydrochloride (55.5 g, 0.35 mol). Ethanol (550 mL) was added, and the mixture was heated to gentle reflux with vigorous stirring to afford an orange slurry. Concentrated hydrochloric acid (30 mL) was added, the mixture was heated to full reflux with stirring, and a precipitate formed within 10 minutes. The mixture was refluxed for 3 hours and cooled to room temperature. The slurry was filtered and washed with ethanol (300 mL), followed by 20% ethanol in water (400 mL) and hexanes (200 mL) to afford an off-white solid (63.3 g, 82.5%).

(b) Preparation of 5,8-dimethyl-5,10-dihydroindeno[1,2-b]indole 1-2 A 1 L 3 neck flask equipped with mechanical stirrer, reflux condenser, and dropping addition funnel was charged with sodium hydroxide (89.0 g, 2.22 mol) dissolved in water (112 mL) and $C_{16}H_{33}NMe_3Br$(0.65 g, 1.8 mmol) as a phase transfer catalyst. Compound 1-1 (36.5 g, 0.17 mol) was added followed by toluene (112 mL) with vigorous stirring. Methyl iodide (17.0 mL, 0.27 mol) in toluene (15 mL) was added dropwise, the mixture turned pale beige and was heated to reflux for 3 hours and cooled to room temperature. The mixture was filtered to afford a pale yellow crystalline solid. The filtrate was separated, the aqueous layer washed with toluene (2×100 mL), and the organic layers were combined, dried over sodium sulfate, filtered, and concentrated until a solid formed, which was washed with chilled (−78° C.) ethanol (200 mL) and hexanes (100 mL) to afford a yellow solid. $^1$H NMR revealed that both the crystalline material (17.0 g) and the precipitated solid (8.8 g) were compound 1-2 (total 25.8 g, combined yield: 66.3%).

(c) 5,8-dimethyl-5,10-dihydroindeno[1,2-b]indol-10-yllithium 1-3 A 500 mL flask equipped with stir bar was charged with 1-2 (14.22 g, 60.94 mmol) and dissolved in toluene (175 mL) to afford an orange solution. n-Butyllithium (38.0 mL, 2.5 M in hexanes, 95.0 mmol) was added by syringe under vigorous stirring at room temperature, and the solution turned red. A precipitate formed after 1 hour, and the mixture was maintained overnight and filtered and washed with toluene (100 mL). The yellow-orange solid was dried under vacuum (14.2 g, 97.1%).

(d) Reaction with dichlorodimethylsilane to give 1-4 Diethylether (115 mL) was added dropwise at room temperature to a slurry of 1-3 (9.87 g, 41.3 mmol) in toluene (110 mL) to afford an orange solution. The solution was added dropwise with vigorous stirring to dichlorodimethylsilane (25.0 mL, 206 mmol) in diethylether (200 mL) at 0° C. The mixture turned cloudy dirty beige and was maintained at room temperature for 2 days and filtered over a pad of Celite to yield a dark red filtrate. The volatiles were removed under vacuum to afford 1-4 as a white solid (12.6 g, 93.8%).

(e) Reaction of 1-4 with sodium cyclopentadienide and subsequent formation of the dianion 1-5 A 500 mL flask with stir bar was charged with 1-4 (6.14 g, 18.8 mmol) and diethylether (200 mL), and the red solution was placed under nitrogen and cooled to −78° C. Sodium cyclopentadienide (9.6 mL, 2M in THF, 19.2 mmol) was added by syringe, and a precipitate formed immediately. The mixture was allowed to warm to room temperature overnight. The mixture was washed with water (100 mL), and the layers were separated. The organic layer was dried over sodium sulfate for an hour and filtered. The volatiles were removed under vacuum to afford an oil. $^1$H NMR was consistent with the desired product and the oil was used as isolated. The oil was dissolved in diethylether (225 mL) and cooled to −78° C. n-Butyllithium (16.0 mL, 2.5 M in hexanes, 40.0 mmol) was added under nitrogen, and a precipitate formed immediately. The cold bath was removed, and the dark yellow slurry warmed to room temperature and stirred for 48 hours. The volatiles were removed under reduced pressure to afford a yellow-orange solid (6.63 g, 99.1%).

(f) Preparation of the indenoindolyl complex 1-6 A 500 mL flask with stir bar was charged with zirconium(IV) chloride (5.03 g, 21.6 mmol) and toluene (250 mL) was added followed by diethylether (50 mL) to afford a water-white solution. Dianion 1-5 (7.95 g, 21.6 mmol) was added at room temperature as a solid over the course of 30 minutes, and the solution turned cloudy and deep orange. The mixture was maintained at room temperature for 48 hours and was filtered to afford 1-6 as an orange solid (9.70 g, 87%).

EXAMPLE 2

Polymerization

Aluminum phosphate (available from Grace Davison; surface area=299 $m^2$/g; pore volume=1.41 mL/g; average particle radius=94.6 Å) was calcined at 250° C. for 4 hours. In a glove-box under nitrogen, a 30 wt. % solution of methylalumoxane (MAO) in toluene (1.85 mL) was slowly added to 0.010 g of indenoindolyl complex 1-6 from Example 1. The resulting solution was added slowly at room temperature with stirring to 1 g of the calcined aluminum phosphate slurried in 5 mL of toluene. The slurry was stirred for 30 minutes and dried under vacuum.

A 2-L stainless steel polymerization reactor was pressure purged with dry nitrogen three times at 70° C. After completely venting the reactor, hydrogen was added as a 1.7 MPa pressure drop from a 7-mL vessel. A solution of 100 mL 1-hexene and 1 L isobutane and 1 mmol triisobutyl aluminum was added to the reactor followed by the supported complex. Ethylene was added to give a total reactor pressure of 2.4 MPa. Temperature was maintained at 70° C. and ethylene pressure was fed on demand to maintain 2.4 MPa for 30 minutes. After 30 minutes of polymerization, the reactor was vented to remove the volatiles. The polymer was removed from the reactor. From the weight of the polymer, the activity was calculated to be 1030 kg polymer per g zirconium per hour. Polymer density was determined by ASTM D-1505 to be 0.9146 g/mL. The melt index (MI) was measured according to ASTM D-1238, Condition E to be 04.6 dg/min. The melt flow ratio (MFR) was measured according to ASTM D-1238 to be 27.5. The melting point was determined by differential scanning calorimetry to be 107° C.

EXAMPLES 3–5 AND COMPARATIVE EXAMPLES 6–12

In similar fashion as Example 2, several polymerizations were performed varying the support, the calcination temperature and the amount of hydrogen. The conditions and results of the polymerizations are summarized in Table 1.

TABLE 1

Polymerizations

| Ex. | Support | Calcination Temp. °C. | $H_2$ dMpa | Activity kg/g Zr/hr | MI | MFR | Density |
|---|---|---|---|---|---|---|---|
| 2 | Aluminum phosphate | 250 | 1.7 | 1030 | 4.6 | 28 | 0.915 |
| 3 | Aluminum phosphate | 250 | 1.0 | 1190 | 0.6 | 37 | |
| 4 | Aluminum phosphate | 600 | 1.7 | 1080 | 4.7 | 30 | 0.913 |
| 5 | Aluminum phosphate | 600 | 1.2 | 1120 | 1.1 | 29 | |
| C6 | Silica (Crosfield ES 757) | 250 | 1.7 | 660 | 1.6 | 97 | 0.924 |
| C7 | Silica (Crosfield ES 757) | 250 | 1.4 | 690 | 1.3 | 53 | |
| C8 | Silica (Crosfield ES 757) | 600 | 1.7 | 660 | 1.8 | 46 | 0.921 |
| C9 | Silica (Davison 948) | 600 | 1.7 | 710 | 1.2 | 54 | 0.919 |
| C10 | Montmorillonite Clay | 200 | 1.7 | 280 | 4.1 | 41 | 0.926 |
| C11 | Alumina | 250 | 1.7 | 320 | 4.4 | 24 | 0.921 |
| C12 | Alumina | 600 | 1.7 | 300 | 2.6 | 20 | 0.916 |

The polymerizations performed with the complex supported on aluminum phosphate gave much higher activity than the comparative polymerizations with the complex on other common support materials. This shows the large benefit of supporting indenoindolyl complexes on aluminum phosphate. The polymerizations with aluminum phosphate gave polyolefins with lower density. This demonstrates that the process gives good comonomer incorporation.

The preceding examples are meant only as illustrations. The following claims define the invention.

We claim:

1. A process which comprises polymerizing an olefin in the presence of an activator, an organometallic complex, and an aluminum phosphate support, wherein the complex comprises a Group 3 to 10 transition metal, M, and at least one indenoindolyl ligand that is bonded to M, wherein the aluminum phosphate has a phosphorus to aluminum molar ratio of about 0.8:1 to about 1.1:1 and wherein the organometallic complex has a structure selected from the group consisting of:

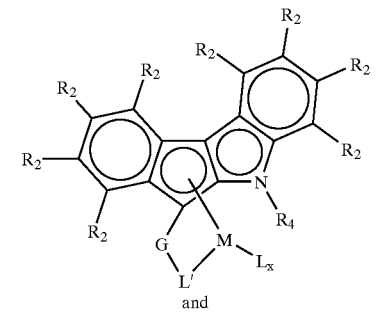

and

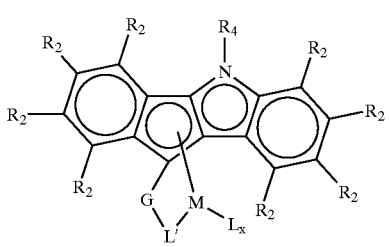

wherein M is a Group 3 to 10 transition metal; each L is independently selected from the group consisting of halide, alkoxy, aryloxy, siloxy, alkylamino, and $C_1-C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_4$ is selected from the group consisting of $C_1-C_{30}$ hydrocarbyl, dialkylboryl and trialkylsilyl; each $R_2$ is independently selected from the group consisting of $C_1-C_{30}$ hydrocarbyl, H, F, Cl and Br; G is a divalent radical selected from the group consisting of hydrocarbyl and heteroatom containing alkylene radicals, diorganosilyl radicals, diorganogermanium radicals and diorganotin radicals.

2. The process of claim 1 wherein L' is selected from the group consisting of substituted or unsubstituted cyclopentadienyl, fluorenyl, indenyl, and indenoindolyl.

3. A process which comprises polymerizing an olefin in the presence of an activator, an organometallic complex, and an aluminum phosphate support, wherein the complex comprises a Group 3 to 10 transition metal, M, and at least one indenoindolyl ligand that is bonded to M, wherein the aluminum phosphate has a phosphorus to aluminum molar ratio of about 0.8:1 to about 1.1:1 and wherein the organometallic complex has a structure selected from the group consisting of:

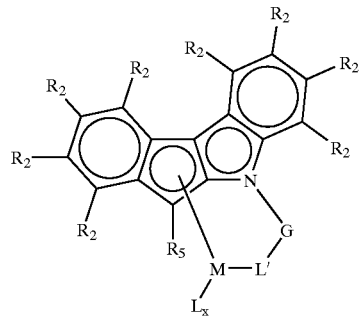

and

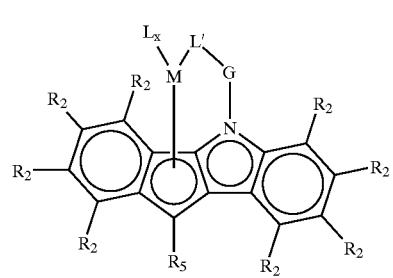

wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_5$ is selected from the group consisting of $C_1$–$C_{30}$ hydrocarbyl and H; each $R_2$ is independently selected from the group consisting of $C_1$–$C_{30}$ hydrocarbyl, H, F, Cl and Br; G is a divalent radical selected from the group consisting of hydrocarbyl and heteroatom containing alkylene radicals, diorganosilyl radicals, diorganogermanium radicals and diorganotin radicals.

4. The process of claim 3 wherein L' is selected from the group consisting of substituted or unsubstituted cyclopentadienyl, fluorenyl, indenyl, and indenoindolyl.

5. A process which comprises polymerizing an olefin in the presence of an activator, an organometallic complex, and an aluminum phosphate support, wherein the complex comprises a Group 3 to 10 transition metal, M, and at least one indenoindolyl ligand that is bonded to M, wherein the aluminum phosphate has a surface area of from about 50 to about 250 $m^2$/gram and wherein the organometallic complex has a structure selected from the group consisting of:

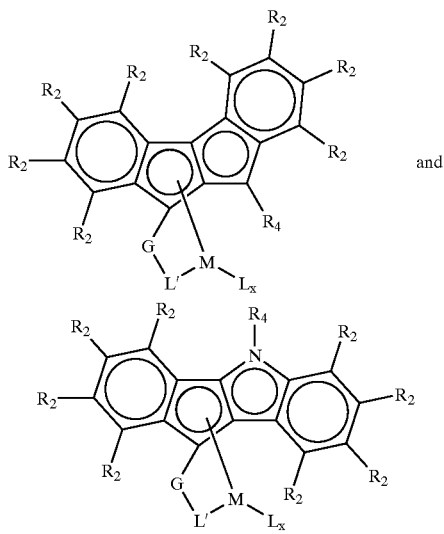

and wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_4$ is selected from the group consisting of $C_1$–$C_{30}$ hydrocarbyl dialkylboryl and trialkylsilyl; each $R_2$ is independently selected from the group consisting of $C_1$–$C_{30}$ hydrocarbyl, H, F, Cl and Br; G is a divalent radical selected from the group consisting of hydrocarbyl and heteroatom containing alkylene radicals, diorganosilyl radicals, diorganogermanium radicals and diorganotin radicals.

6. The process of claim 5 wherein L' is selected from the group consisting of substituted or unsubstituted cyclopentadienyl, fluorenyl, indenyl, and indenoindolyl.

7. A process which comprises polymerizing an olefin in the presence of an activator, an organometallic complex, and an aluminum phosphate support, wherein the complex comprises a Group 3 to 10 transition metal, M, and at least one indenoindolyl ligand that is bonded to M, wherein the aluminum phosphate has a surface area of from about 50 to about 250 $m^2$/gram and wherein the organometallic complex has a structure selected from the group consisting of:

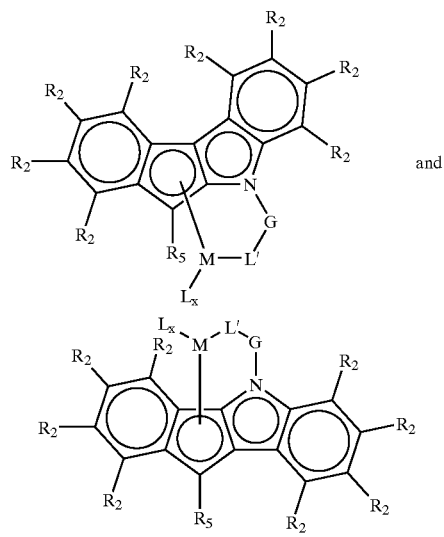

and wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_5$ is selected from the group consisting of $C_1$–$C_{30}$ hydrocarbyl and H; each $R_2$ is independently selected from the group consisting of $C_1$–$C_{30}$ hydrocarbyl, H, F, Cl and Br; G is a divalent radical selected from the group consisting of hydrocarbyl and heteroatom containing alkylene radicals, diorganosilyl radicals, diorganogermanium radicals and diorganotin radicals.

8. The process of claim 7 wherein L' is selected from the group consisting of substituted or unsubstituted cyclopentadienyl, fluorenyl, indenyl, and indenoindolyl.

* * * * *